United States Patent
Hiramatsu et al.

(10) Patent No.: US 8,516,097 B2
(45) Date of Patent: Aug. 20, 2013

(54) SERVER MANAGING APPARATUS AND SERVER MANAGING METHOD

(75) Inventors: Kouji Hiramatsu, Kawasaki (JP); Hiromasa Ishii, Kawasaki (JP); Aya Matsuda, Shibuya (JP); Tsunehisa Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 12/320,590

(22) Filed: Jan. 29, 2009

(65) Prior Publication Data

US 2009/0282141 A1 Nov. 12, 2009

(30) Foreign Application Priority Data

May 12, 2008 (JP) ................................. 2008-124904

(51) Int. Cl.
*G06F 15/173* (2006.01)
*G06F 15/177* (2006.01)

(52) U.S. Cl.
USPC ............................ 709/223; 709/224; 715/736

(58) Field of Classification Search
USPC ......................................................... 709/223
See application file for complete search history.

(56) References Cited

U.S. PATENT DOCUMENTS

| | | | | |
|---|---|---|---|---|
| 2002/0052941 | A1* | 5/2002 | Patterson | 709/223 |
| 2005/0047339 | A1* | 3/2005 | Dube et al. | 370/230 |
| 2005/0195075 | A1* | 9/2005 | McGraw et al. | 340/500 |
| 2005/0235055 | A1 | 10/2005 | Davidson | |
| 2007/0130481 | A1* | 6/2007 | Takahashi et al. | 713/300 |
| 2007/0219673 | A1* | 9/2007 | Wang | 701/1 |
| 2007/0255814 | A1* | 11/2007 | Green et al. | 709/223 |
| 2008/0059626 | A1* | 3/2008 | Campbell et al. | 709/224 |
| 2009/0055599 | A1* | 2/2009 | Patten Benhase et al. | 711/153 |
| 2009/0135698 | A1* | 5/2009 | Fujibayashi et al. | 369/53.42 |

FOREIGN PATENT DOCUMENTS

| | | |
|---|---|---|
| JP | 9-223092 | 8/1997 |
| JP | 2001-005691 | 1/2001 |
| JP | 2002-132340 | 5/2002 |
| JP | 2005-309569 | 11/2005 |
| JP | 2007-533034 | 11/2007 |
| WO | 2006/063276 A1 | 6/2006 |

OTHER PUBLICATIONS

European Search Report dated Jan. 18, 2010 issued in corresponding European Patent Application 09151806.8.
Chinese Office Action issued Jun. 23, 2011 in corresponding Chinese Patent Application 200910003272.6 (3 pages) (5 pages of English translation.

(Continued)

*Primary Examiner* — Douglas Blair
*Assistant Examiner* — Angela Nguyen
(74) *Attorney, Agent, or Firm* — Staas & Halsey LLP

(57) ABSTRACT

A controlling unit obtains server information from a server group in a chassis to store the obtained server information in a server information DB, an editing unit reads the server information from the server information DB, and generates, based on the read server information, as screen display information, physical server information, and logical server information including information on use application and attribute information for a logical server, which are related to a physical location of each physical server, and a displaying unit displays screen display information on a screen simulating the physical location of the physical server.

6 Claims, 15 Drawing Sheets

(56) References Cited

OTHER PUBLICATIONS

Hewlett-Packard Development Company, "HP BladeSystem Integrated manager of HP System Insight Manager", p. 11, 12, 19, 20, 32 and 33, [on line], May 2006, version 4.0, [searched on Oct. 3, 2012], <URL:http://h50146.www5.hp.com/lib/products/servers/proliant/manuals/381270-194-j.pdf>, (6 pages) (9 pages English translation).
Hewlett-Packard, "HP System Insight Manager technical reference guide", p. 404, 405, and 457, [on line], May 2006, version 5.0, [searched on Oct. 3, 2012], <URL:http://h50145.www5.ho.com/lib/producs/servers/proliant/manuals/359620-198.pdf>, (3 pages) (4 pages English translation).
Second Japanese Office Action issued Oct. 16, 2012 in corresponding Japanese Patent Application No. 2008-124904 (7 pages) (10 pages English translation).
Japanese Office Action issued Jun. 15, 2012 in corresponding Japanese Patent Application 2008-124904 (12 pages) (22 pages).
Third Japanese Office Action mailed Mar. 5, 2013 in corresponding Japanese Patent Application No. 2008-124904 (4 pages) (6 pages English translation).
Hewlett-Packard, "HP System Insight Manager technical reference guide", p. 403-406, and 457, [on line], May 2006, version 5.0, [searched on Oct. 3, 2012], <URL:http://h50146.www5.hp.com/lib/producs/servers/proliant/manuals/356920-198.pdf>, (5 pages) (7 pages English translation).

* cited by examiner

SERVER MANAGING APPARATUS AND SERVER MANAGING METHOD

CROSS-REFERENCE TO RELATED APPLICATIONS

This application is based upon and claims the benefit of priority of the prior Japanese Patent Application No. 2008-124904, filed on May 12, 2008, the entire contents of which are incorporated herein by reference.

FIELD

The present invention relates to a server managing apparatus and a server managing method, and particularly, to the server managing apparatus and the server managing method for managing a server by displaying, on a screen simulating a physical location of a physical server, physical server information, and logical server information including information on use application and attribute information for a logical server.

BACKGROUND

Conventionally, there has been monitoring software obtaining information such as a server name, a host name and an IP address from the server. Conventionally, the use application for the server has been managed by using a sticky note, TEPRA (registered trademark) label writer and so on.

Meanwhile, a condition display apparatus has been proposed in which, when a monitored apparatus is in the abnormal condition, elapsed from the occurrence of the abnormal condition, a display size of an abnormal mark indicating the abnormal condition is caused to be larger (for example, refer to Japanese Laid-Open Patent Publication No. 2002-132340).

In recent years, not only a person with high level expertise for the server, but also a general office user frequently has managed the server as an additional job. For example, while a resource for the blade server is increasing, it has been difficult to collectively manage the resource, and information necessary for an operation. Here, since such a case has been increasing that one physical server is operated as a plurality of virtual servers (virtual machines) by using virtualization technology, it has been difficult to comprehend correspondence between the physical server and the virtual server.

In the conventional technique in which the monitoring software manages the server by obtaining the information such as the server name, the host name and the IP address from the server, it is not possible to display, on the screen simulating the physical location of the physical servers, physical server information, and logical server information including the information on the use application for the logical server and so on, which are related to each physical server, and to cause a user to comprehend the information for a server group to be managed, which includes a plurality of the physical servers functioning as the logical server.

In the conventional technique, it is not possible to list-display, in one screen, status of the whole server group, status of each server, status of the logical server, and the use application for each server.

When the physical server is switched to another physical server, or the physical location of the physical server is moved, in some conventional technique in which, the use application for the server is managed by using the sticky note, TEPRA (registered trademark) label writer and so on, it is difficult to comprehend which server is used for which use.

SUMMARY

The server managing apparatus is a server managing apparatus managing a server group including a plurality of physical servers functioning as a logical server. The server managing apparatus comprises a storing unit for storing, as server information, physical server information, and logical server information including information on use application and attribute information for the logical server, and a displaying unit for reading the server information from the storing unit, and displaying, based on the server information, on a screen simulating a physical location of the physical server, the physical server information, and the logical server information including the information on the use application and the attribute information for the logical server, which are related to the physical location of each of the physical servers.

The server managing method is a server managing method in a server managing apparatus managing a server group including a plurality of physical servers functioning as a logical server. The server managing method comprises reading server information from a storing unit for storing, as the server information, physical server information, and logical server information including information on use application and attribute information for the logical server, and displaying, based on the server information, on a screen simulating a physical location of the physical server, the physical server information, and the logical server information including the information on the use application and the attribute information for the logical server, which are related to the physical location of each of the physical servers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT (S)

Figure 1:
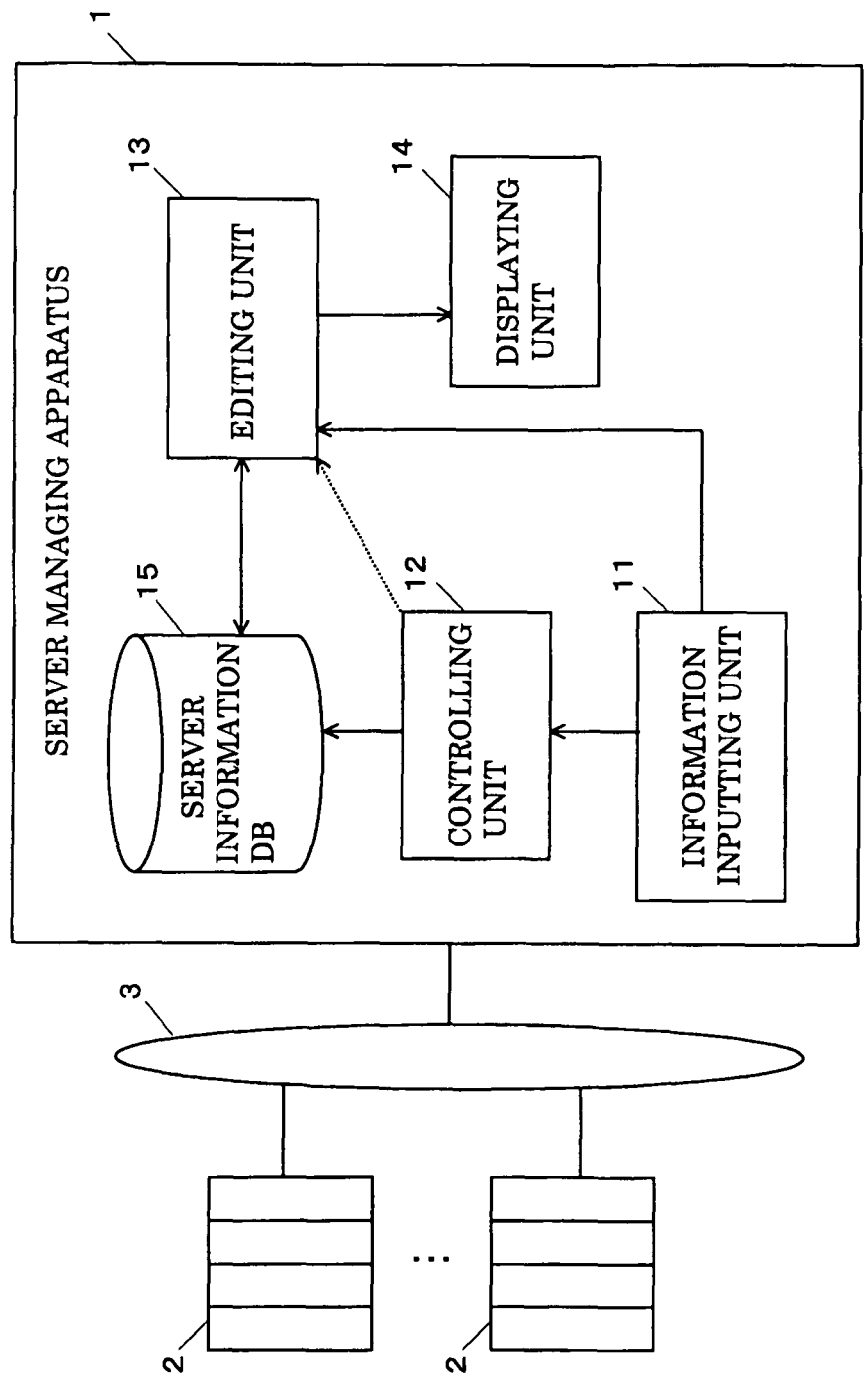
FIG. 1 is a diagram illustrating an example of a structure of the present embodiment.

The present embodiment will be described below by using diagrams. FIG. 1 is a diagram illustrating an example of a structure of the present embodiment. A server managing apparatus 1 is a processing apparatus managing the server group including a plurality of the physical servers stored in each slot in a chassis 2. The server group is for example, the blade server. The server managing apparatus 1 is connected to one or a plurality of the chassis 2 (and the physical servers in the chassis 2) through a network 3. The chassis 2 is a chassis for storing the physical server, and each of a plurality of the physical servers stored in the chassis 2 functions as the logical server including the virtual machine (virtual server). That is, each of the physical servers is related to the logical server.

The server managing apparatus 1 includes an information inputting unit 11, a controlling unit 12, an editing unit 13, a displaying unit 14, and a server information database (DB) 15. The information inputting unit 11 inputs information (selection information) according to a selecting operation, by a user of the server managing apparatus 1, on an after-mentioned server information display screen. The selection information is, for example, information indicating that a specific area on the server information display screen, a button, an icon and so on is selected. According to a designated input by the user, the information inputting unit 11 inputs information (setting information for the server information) for setting the server information in the server information DB 15. The server information is an after-mentioned physical server information, and an after-mentioned logical server information including the information on the use application and the attribute information for the logical server which are related to the physical location (for example, the slot in the chassis 2, in which the physical server is stored) of the physical server.

The controlling unit 12 obtains the server information from the server group in each chassis 2 through the network 3 to store the obtained server information in the server information DB 15. The controlling unit 12 sets or updates the server information in the server information DB 15 based on the setting information for the server information, which is inputted by information inputting unit 11. That is, the server managing apparatus 1 can set or update the server information by using the controlling unit 12.

The controlling unit 12 obtains, for example, from the server group in the chassis 2 through network 3, information (server switch information) indicating that the first physical server is switched to the second physical server in the chassis 2. The controlling unit 12 relates, for example, based on the obtained server switch information, the logical server information (the information on the use application and the attribute information for the logical server, which are included in the logical server information) related to the first physical server in the server information DB 15 to the second physical server. The controlling unit 12 instructs the after-mentioned editing unit 13 to relate the information on the use application and the attribute information for the logical server, which are included in the related logical server information, to the physical location of the second physical server to display the information. As a result, according the switching for the physical server, the information on the use application and the attribute information for the logical server, which are included in the logical server information related to the physical location of the physical server, can be automatically displayed.

According to an embodiment of the present invention, the controlling unit 12 may obtain information, which indicates that the physical location of the first physical server is moved, as server movement information. The controlling unit 12 relates, based on the server movement information, the logical server information (the information on the use application and the attribute information for the logical server, which are included in the logical server information) related to the first physical server (for example, the physical server whose slot storing the physical server is changed), whose physical location is moved, in the server information DB 15 to the moved physical location. The controlling unit 12 instructs the editing unit 13 to relate the information on the use application and the attribute information for the logical server, which are included in the logical server information, to the moved physical location to display the information. As a result, according the movement of the physical server, the information on the use application and the attribute information for the logical server, which are included in the logical server information related to the physical location of the physical server, can be automatically displayed.

The controlling unit 12 may obtain, through the network 3, the above server switch information and server movement information from a controlling apparatus (not shown) controlling to switch the physical server in each chassis 2. The information inputting unit 11 may input, according to the designated input by the user, the server switch information and the server movement information, and the controlling unit 12 may obtain the inputted server switch information and server movement information.

The editing unit 13 reads the server information from the server information DB 15, generates information (screen display information) to be displayed on the server information display screen based on the read server information and the selection information inputted by information inputting unit 11, and instructs the displaying unit 14 to display the generated screen display information on the screen simulating the physical location of the physical server. The editing unit 13 generates, for example, as the screen display information, the physical server information related to the physical location of each physical server, and the logical server information including the information on the use application and the attribute information for the logical server, and causes the displaying unit 14 to display the generated information. The user referring to the display result becomes able to easily comprehend relation between the physical server information and the information on the use application and the attribute information for the logical server, which are included in the logical server information.

The editing unit 13 may display, on the screen simulating the physical location of the physical server, the condition of the physical server corresponding to the physical server information, and the condition of the logical server corresponding to the above logical server information, which are related to the physical location of the physical server. The user referring to the display result can easily comprehend the condition of the physical server and the condition of the logical server, which are related to the physical location of the physical server. The editing unit 13 may make information according to the instruction by the controlling unit 12 as the screen display information.

The displaying unit 14 displays the screen display information generated by the editing unit 13. The server information DB 15 stores the server information of each server group in each chassis 2.

The process of each processing unit provided in the server managing apparatus 1 is realized by a not shown CPU and a program executed on the CPU. The program can be stored in a computer-readable recording medium, and is provided as recorded in the recording medium, or is provided by the transmission and receiving operation utilizing a network through a communication interface.

Figure 2:
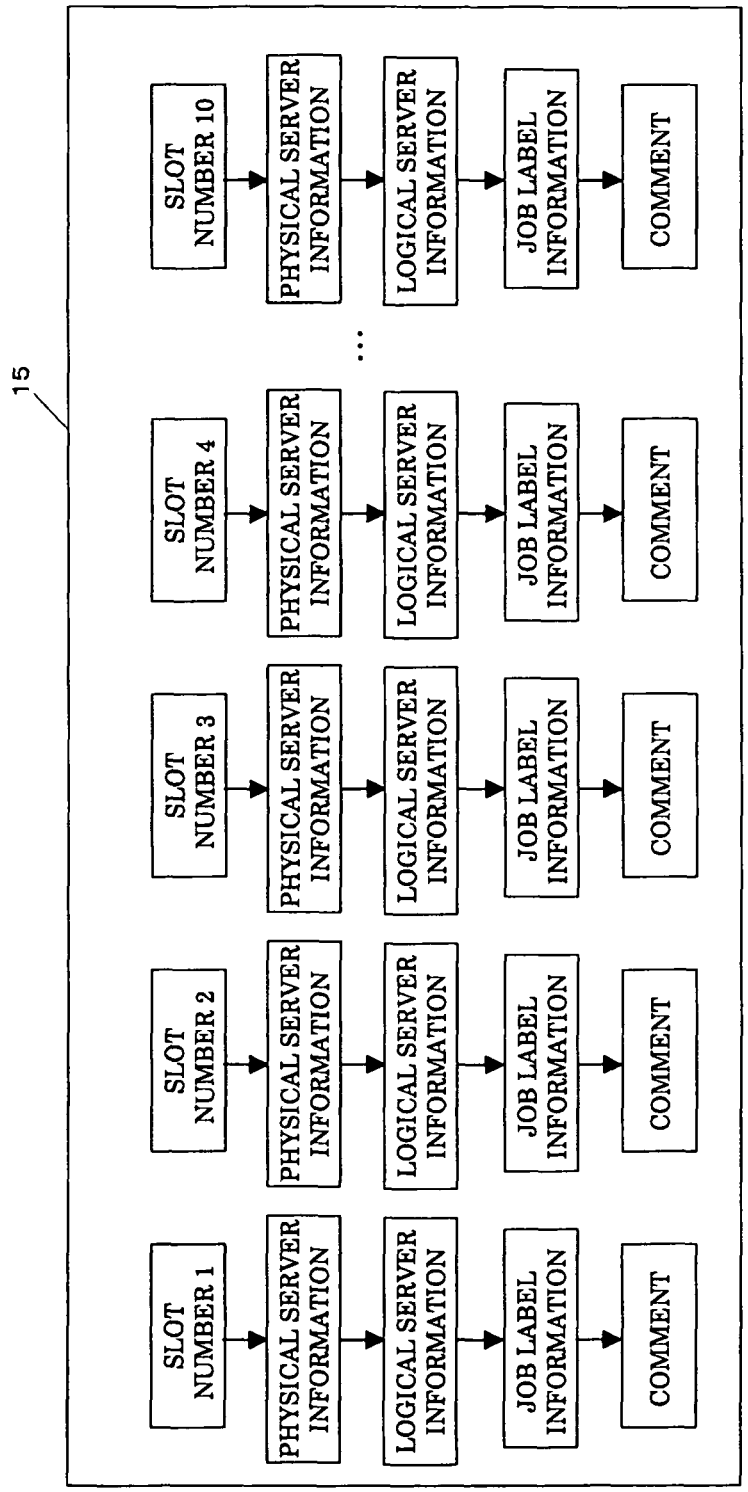
FIG. 2 is a diagram illustrating an example of a structure of server information in a server information DB.

FIG. 2 is a diagram illustrating an example of a structure of the server information in the server information DB 15. In FIG. 2, the example of the structure of the server information will be described by using, as an example, the server information corresponding to the server group in some chassis 2. As illustrated in FIG. 2, the server information includes information such as the physical server information, the logical server information, job label information, and a comment that are related to each slot number. The slot number is an identification number of the slot in which the physical server is stored. The physical server information is information on the physical server. The physical server information, for example, includes information indicating the power condition of the physical server, the condition of the physical server, the icon indicating the physical server and so on. The condition of the physical server indicates that the physical server is in any of the stop condition, the error condition, the normal condition, the alarm condition and so on.

The logical server information is information on the logical server related to the physical server. The logical server information includes, for example, information indicating a type of an OS (Operating System), the condition of the logical server, the icon (logical server icon) indicating the logical server and so on. The condition of the logical server indicates that the logical server is in one of the stop condition, the error condition, the normal condition, the alarm condition and so on. The logical server information includes the after-mentioned job label information and information on the comment.

When the physical server functions as a guest server (for example, VM (Virtual Machine) Guest) which are a plurality of the virtual servers, the logical server information includes information (VMHost information) on a virtual host (for example, VMHost) managing the VM Guest, and information (VMGest information) on the guest server. In this case, the type of the OS indicates the OS of the VMHost. The VMHost information includes information indicating the icon (VM icon) indicating the VMHost. The VMGest information includes, for example, a guest server name, the icon (guest icon) of the guest server, the condition of the guest server, the power condition of the guest server, and the OS of the guest server. The condition of the guest server indicates that the guest server is in one of the stop condition, the error condition, the normal condition, the alarm condition and so on.

The job label information is information indicating the use application for the logical server. The job label information includes, for example, character information such as "For XX of marketing 1". When the physical server functions as a plurality of the virtual servers (guest servers), the job label information related to the physical server includes the job label information (information on the use application for the VMHost) corresponding to the VMHost, and the job label information (information on the use application for the guest server) corresponding to the guest server. The comment is the attribute information on the logical server. The comment, for example, includes information on a person in charge of the logical server, a contact address of the person, and a dealing method when a failure is induced in the logical server.

Meanwhile, for the physical server that is not registered in the server managing apparatus 1 (waiting condition), only the physical server information is stored as the server information in the server information DB 15.

Figure 3:
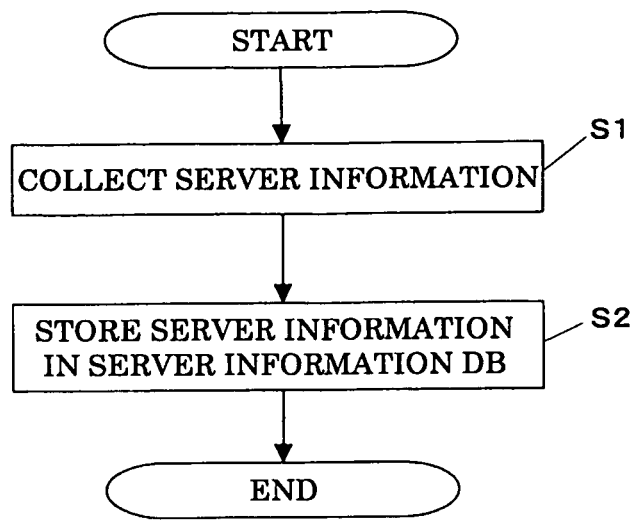
FIG. 3 is a diagram illustrating an example of a collecting process flow for collecting server information.

FIG. 3 is a diagram illustrating an example of a collecting process flow for collecting the server information. First, the controlling unit 12 collects the server information (step S1), and stores the collected server information in the server information DB 15 (step S2).

Figure 4:
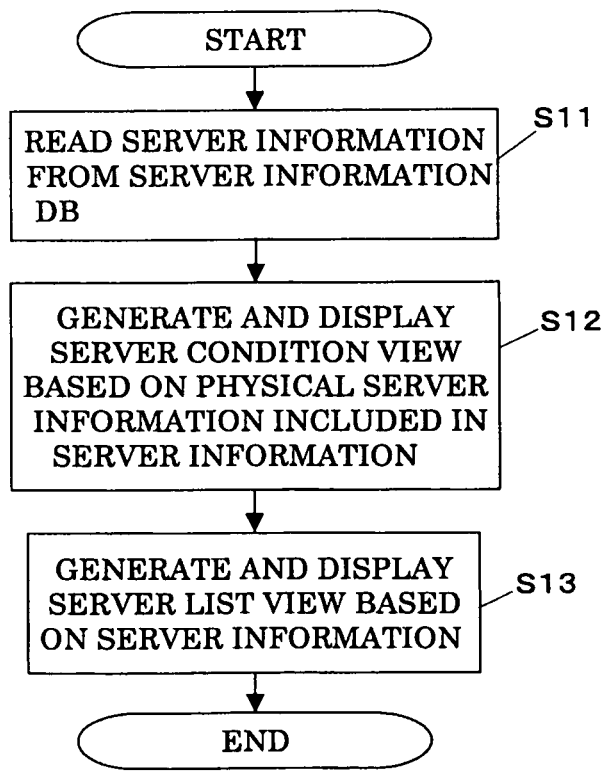
FIG. 4 is a diagram illustrating an example of a displaying process flow for displaying screen display information on a server information display screen.
Figure 5:
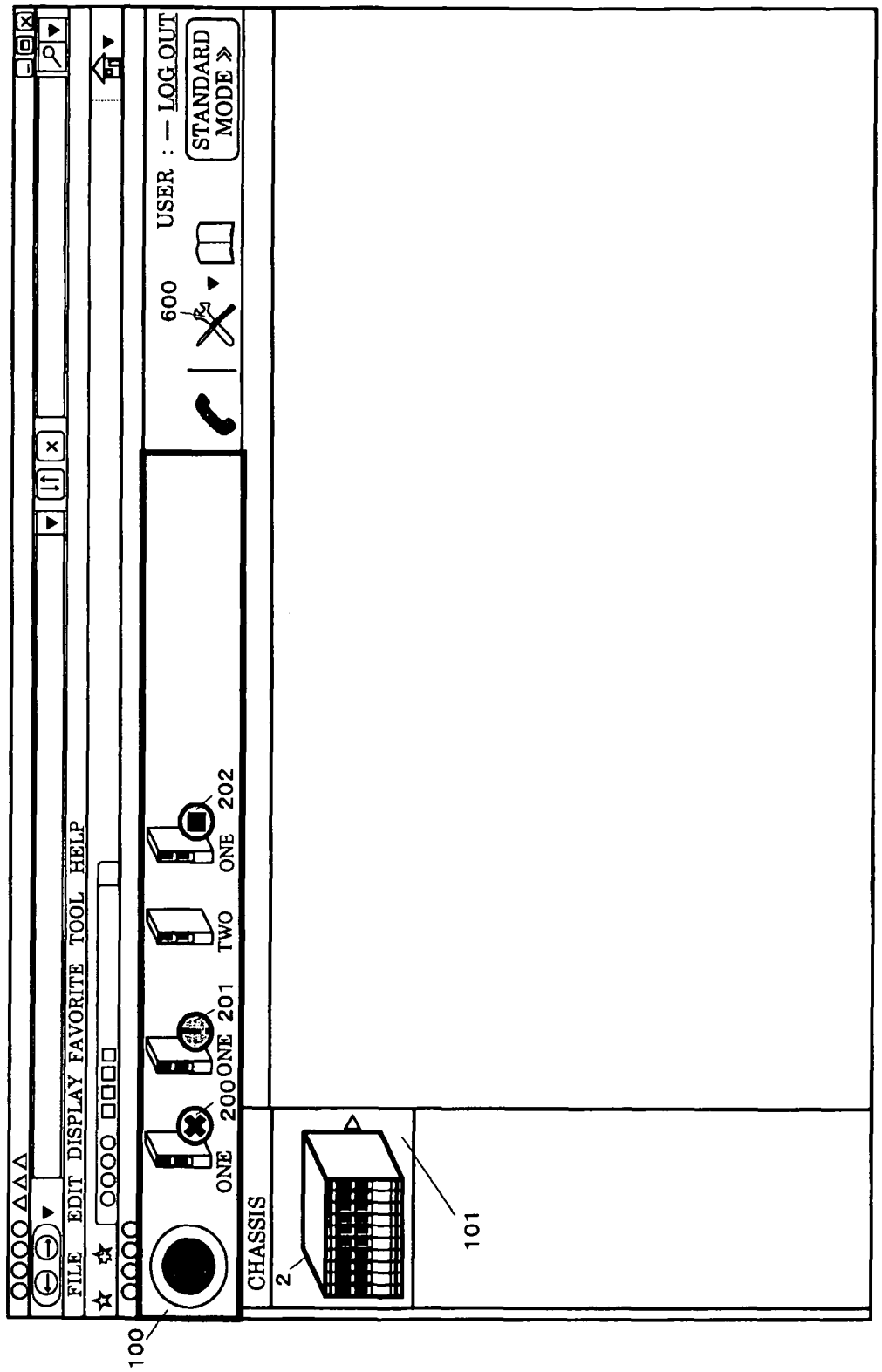
FIGS. 5, 6, 9 and 11 are diagrams illustrating examples of the server information display screen.

FIG. 4 is a diagram illustrating an example of a displaying process flow for displaying the screen display information on the server information display screen. First, the editing unit 13 reads the server information from the server information DB 15 (step S11). For example, the editing unit 13 reads the server information corresponding to the server group in the chassis 2 to be managed from the server information DB 15. The chassis 2 to be managed is the chassis 2 displayed in a chassis display area 101 in the initial server information display screen as illustrated in FIG. 5. The editing unit 13 generates a server condition view based on the physical server information included in the read server information, and the displaying unit 14 displays, for example, a server condition view 100 illustrated in an area surrounded by a heavy line in the server information display screen in FIG. 5 (step S12). The server condition view 100 is information indicating the number of the physical servers for each condition (normal condition, error condition, alarm condition, and stop condition) of the physical server for all the physical servers included in the server group in the chassis 2 to be managed. The editing unit 13 instructs the displaying unit 14 to display, in the server condition view 100 illustrated in FIG. 5, the icon (physical server icon) indicating the physical server, and information on the number of the physical servers whose condition is indicated by a condition icon, which are related to the condition icon indicating the condition of the physical server. For example, a condition icon 200 in the server condition view 100 illustrated in FIG. 5 indicates the error condition, and a condition icon 201 indicates the alarm condition (such a condition that alarm is outputted from the physical server). A condition icon 202 indicates the stop condition. The number of the physical servers related to the physical server icon, to which the condition icon is not attached, indicates the number of the physical servers in the normal condition.

Figure 6:
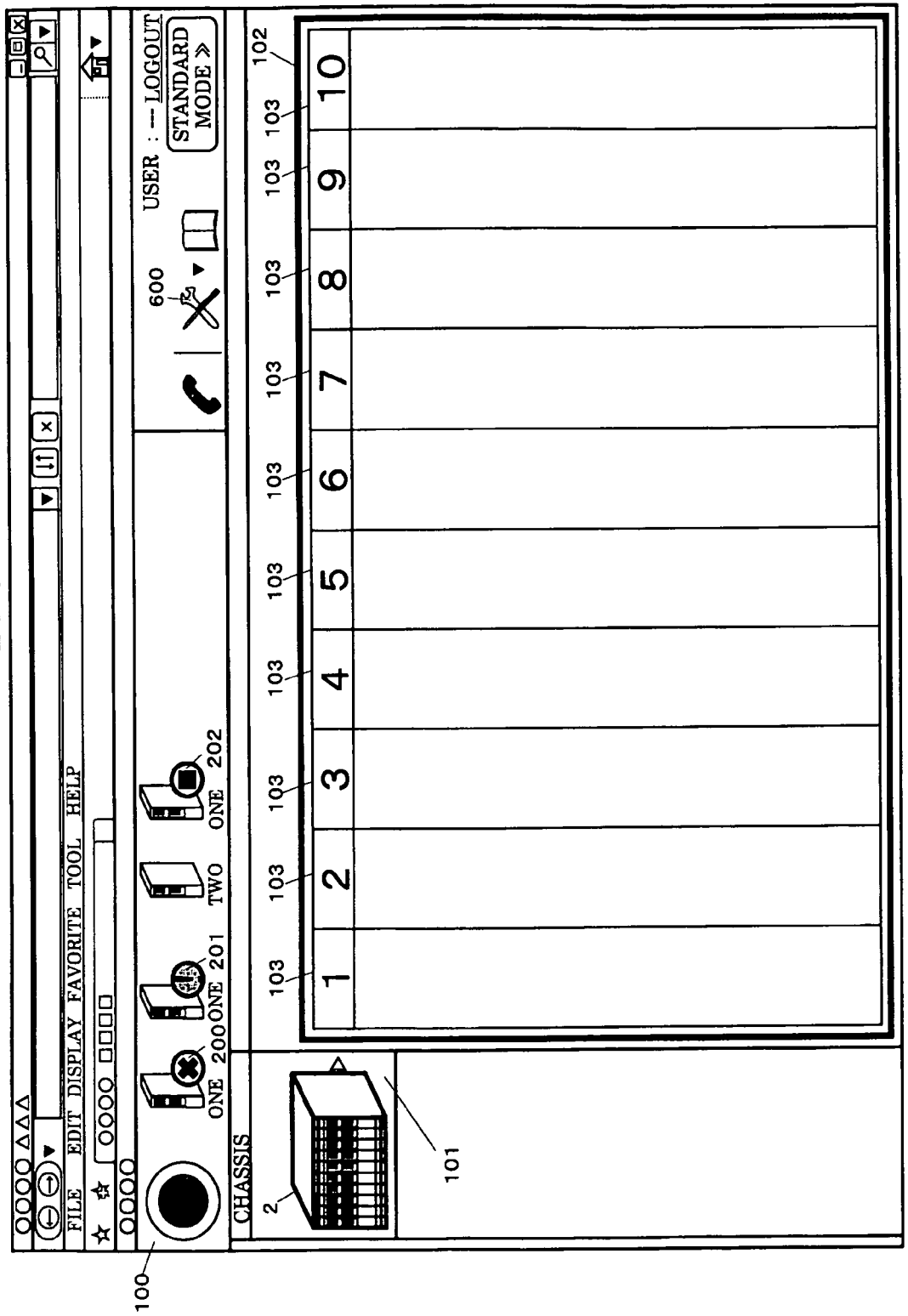

Next, the editing unit 13 generates a server list view based on the server information, and the displaying unit 14 displays a server list view 102 illustrated in an area surrounded by a heavy line in the server information display screen in FIG. 6 (step S13). Specifically, the editing unit 13 obtains information, which is included in the server information, on the slot number (for example, the slot numbers from slot number 1 to slot number 10) of the slot storing the physical server, and displays the server list view 102 by displaying a slot correspondence information display area 103 corresponding to each slot number on the server information display screen.

The server list view 102 is an area in which the physical server information included in the server group in the chassis 2, and the logical server information including the information on the use application and the attribute information for the logical server which are related to the physical location of the physical server are displayed. That is, the server information display screen displaying the server list view 102 is a screen simulating the physical location of the physical server. According to the after-mentioned process by referring to FIG. 7, the server information (the physical server information and the logical server information including the information on the use application and the attribute information for the logical server) for each slot storing the physical server is displayed in each slot correspondence information display area 103 in the server list view 102 illustrated in FIG. 6. Meanwhile, the numbers 1 to 10 displayed in the slot correspondence information display area 103 in FIG. 6 are the slot numbers of the slots in the chassis 2.

Figure 7:
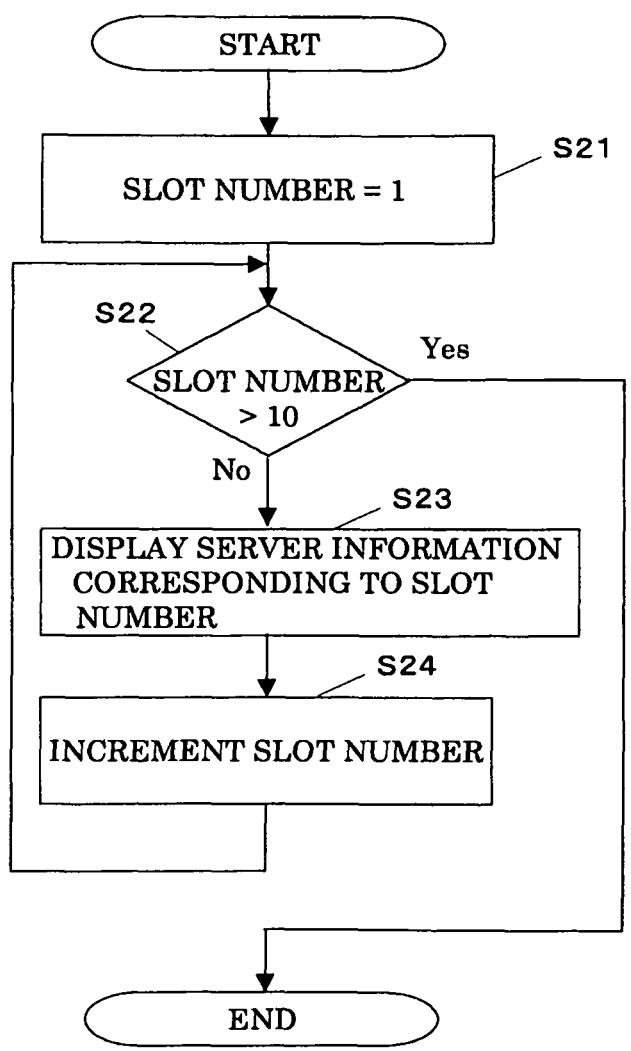
FIG. 7 is a diagram illustrating an example of a displaying process flow for displaying the server information on a server list view.

FIG. 7 is a diagram illustrating an example of a displaying process flow for displaying the server information on the server list view 102. First, the editing unit 13 sets the slot number "1" in a not shown predetermined counter (step S21). The editing unit 13 determines whether the set slot number is larger than a predetermined value (for example, 10 which is a value of the total number of the slots in the chassis 2) (step S22). When the editing unit 13 determines that the slot number is larger than the predetermined value, the process is completed. When the editing unit 13 determines that the slot number is not larger than the predetermined value, the editing unit 13 instructs the displaying unit 14 to display the server information corresponding to the slot number of the server information read at the step S11 of FIG. 4 in the slot correspondence information display area 103 corresponding to the slot number (step S23). The editing unit 13 increments the slot number (step S24), and the process returns to the step S22.

Figure 8:
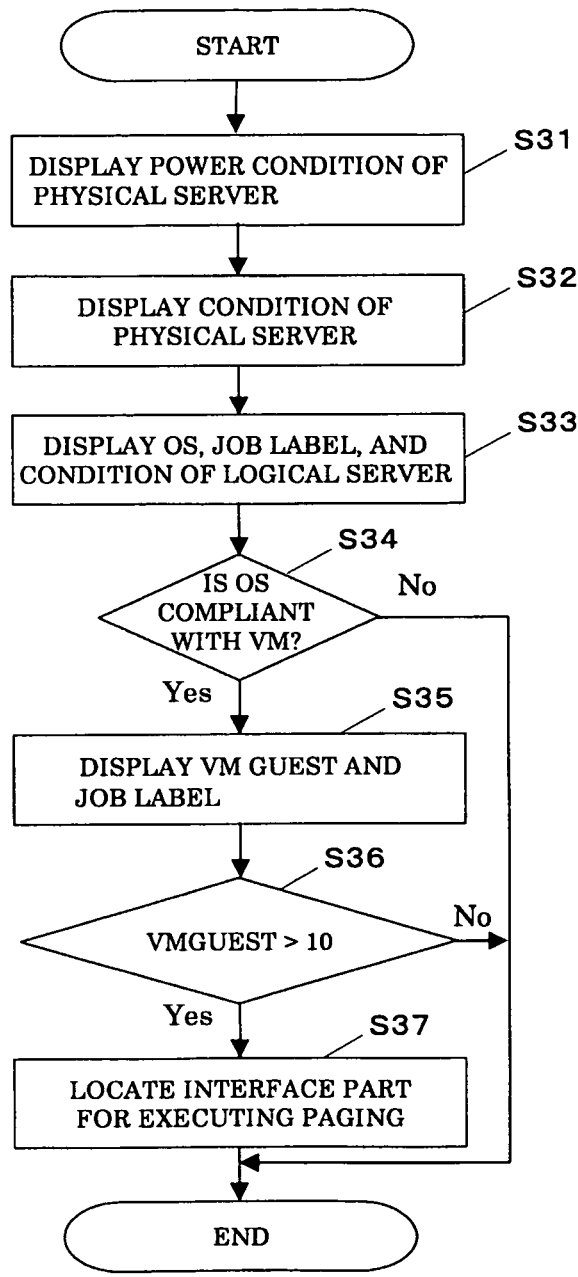
FIG. 8 is a diagram describing the detail of a displaying process for displaying the server information in a slot correspondence information display area.
Figure 9:
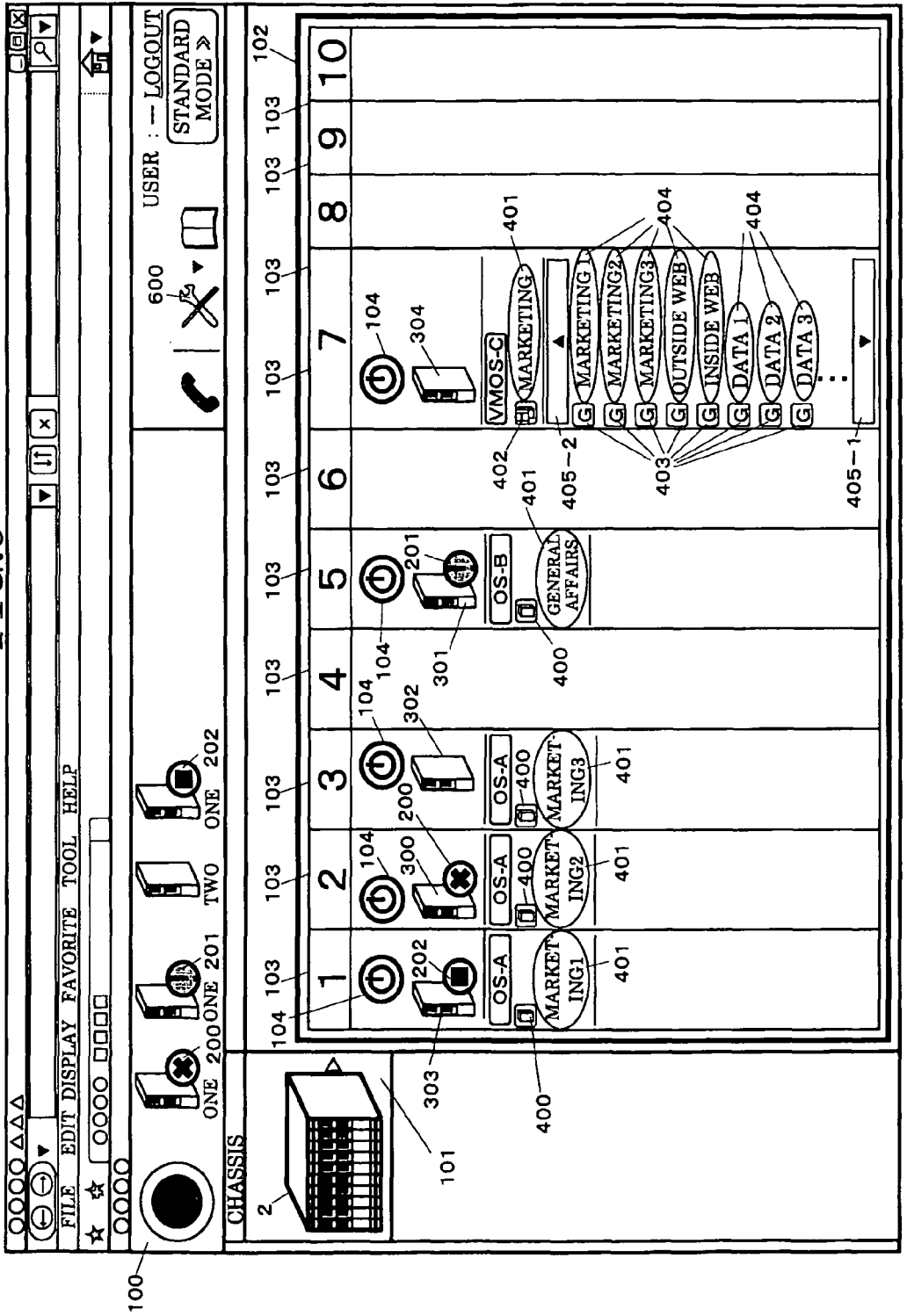

FIG. 8 is a diagram describing the detail of a displaying process for displaying the server information in the slot correspondence information display area 103 at step S23 in FIG. 7. First, the displaying unit 14 displays the power condition, which is included in the server information, of the physical server (step S31). For example, as illustrated in FIG. 9, the icon (power condition icon) 104 indicating the power condition is displayed in the slot correspondence information display area 103 corresponding to each slot number in the server information display screen. Meanwhile, when the user selects the power condition icon 104, the controlling unit 12 transmits a control signal to the server corresponding to the power condition icon 104 through the network 3, and turns ON or OFF the power of the server corresponding to the power condition icon 104.

Next, the displaying unit 14 displays the condition of the physical server stored in the slot indicated by each slot number in the slot correspondence information display area 103 corresponding to each slot number (step S32). For example, as illustrated in FIG. 9, a physical server icon 303 indicating the physical server stored in the slot of the slot number 1, and a condition icon 202 indicating that the physical server is in the stop condition are displayed in the slot correspondence information display area 103 corresponding to the slot of the slot number 1. For example, a physical server icon 300 indicating the physical server stored in the slot of the slot number 2, and a condition icon 200 indicating that the physical server is in the error condition are displayed in the slot correspondence information display area 103 corresponding to the slot of the slot number 2. For example, a physical server icon 302 and a physical server icon 304 indicating the physical servers stored in the slots of the slot number 3 and the slot number 7 are displayed in the slot correspondence information display area 103 corresponding to the slot number 3 and the slot number 7 respectively. Since the physical servers indicated by the physical server icon 302 and the physical server icon 304 are, for example, in the normal condition, the condition icon is not displayed. For example, a physical server icon 301 indicating the physical server stored in the slot number 5, and the condition icon 201 indicating that the physical server is in the alarm condition are displayed in the slot correspondence information display area 103 corresponding to the slot number 5.

Next, the displaying unit 14 displays the OS included in the server information, a job label indicating the job label information included in the server information, and the condition of the logical server, which is included in the server information (step S33). For example, as illustrated in FIG. 9, the displaying unit 14 displays a logical server icon 400 in the slot correspondence information display area 103 corresponding to the slot number 1, and displays the OS, the job label corresponding to the logical server indicated by the logical server icon 400, and the condition of the logical server. "OS-A", "OS-B", "VMOS-C" and so on displayed in the slot correspondence information display area 103 in FIG. 9 indicate the OS indicated at step S33. Meanwhile, for example, "VMOS-C" displayed in the slot correspondence information display area 103 of the slot number 7 in FIG. 9 is the virtual machine-compliant OS. A job label 401, in which "marketing 1", "marketing 2", "marketing 3", "marketing", "general affairs" and so on is described, which are displayed in the slot correspondence information display area 103 in FIG. 9, indicates the job label displayed at step S33. The displaying unit 14 expresses, for example, each condition of the logical server by using the logical server icon 400 in a different display format.

Meanwhile, when the physical server functions as a plurality of the guest servers, at the above step S33, a VM icon indicating the VMHost managing the guest server is displayed instead of the logical server icon 400. For example, when the physical server stored in the slot of the slot number 7 functions as a plurality of the guest servers, a VM icon 402 indicating the VMHost is displayed in the slot correspondence information display area 103 corresponding to the slot number 7 in FIG. 9. A job label 401 indicating the use application for the VMHost is displayed.

Since the job label is displayed by the process at the step S33, the user can comprehend the use application for the server at a glance. As a result, the user can, without question, smoothly execute a power ON operation or a power OFF operation for the server.

Next, the editing unit 13 determines whether the OS is compliant with the virtual machine (VM) (VM-compliant) (step S34). When the editing unit 13 determines that the OS is not compliant with the virtual machine, the process is completed. When the editing unit 13 determines that the OS is compliant with the virtual machine, the editing unit 13 instructs the displaying unit 14 to display the guest icon of the guest server (VMGuest) and the job label corresponding to the guest server (step S35). For example, when the physical server stored in the slot of the slot number 7 functions as a plurality of the guest servers, the OS of the VMHost managing the guest server is the virtual machine-compliant OS. Thus, as illustrated in FIG. 9, a guest icon 403 and a job label 404 corresponding to the guest server are displayed in the slot correspondence information display area 103 corresponding to the slot number 7.

The editing unit 13 determines whether the number of the guest servers exceeds a predetermined number (for example, 10) (step S36). When the editing unit 13 determines that the number of the guest servers does not exceed the predetermined number, the process is completed. When the editing unit 13 determines that the number of the guest servers exceeds the predetermined number, the editing unit 13 instructs the displaying unit 14 to locate an interface part for executing the paging (step S37). For example, as illustrated in FIG. 9, interface parts 405-1 and 405-2 for executing the paging are located in the slot correspondence information display area 103 corresponding to the slot number 7. When the user selects, for example, the interface part 405-1, the guest servers whose number is the number exceeding the above predetermined number are displayed in the next page.

Figure 11:
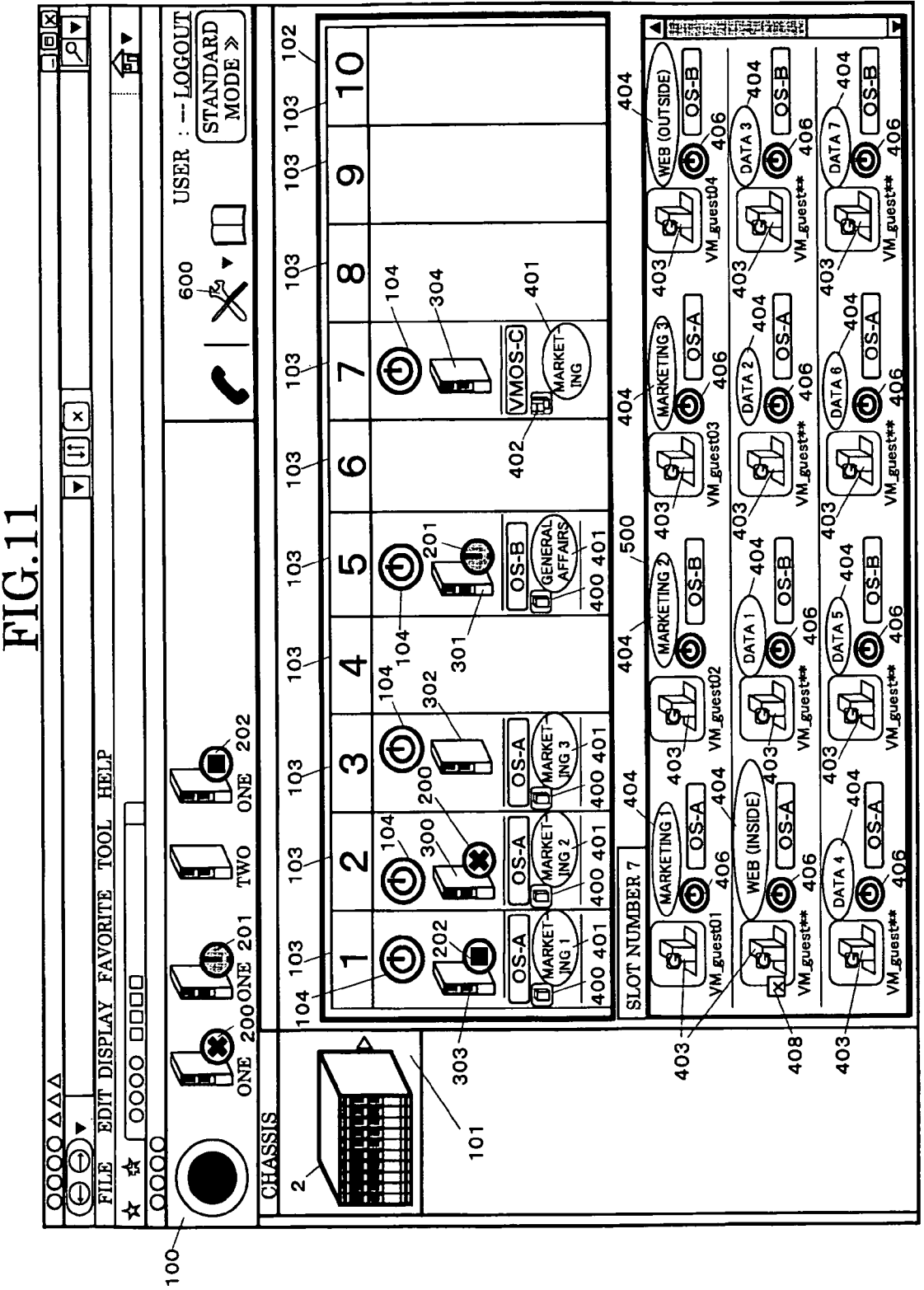

On the server information display screen illustrated in FIG. 9, when the user clicks a VMOS-3 which is the OS of the VMHost, which is displayed in the slot correspondence information display area 103 corresponding to the slot number 7, based on the server information corresponding to the slot number 7, the editing unit 13 generates a VMGuest detail view 500 as illustrated in the server information display screen illustrated in after-mentioned FIG. 11, and causes the displaying unit 14 to display the VMGuest detail view 500. The VMGuest detail view 500 is displayed in a display area that is different from the display area for the server list view 102. For example, a guest server name of the guest server managed by the VMHost, an icon (guest icon) 403 of the guest server, a condition icon 408 indicating the condition of the guest server, a power condition icon 406 indicating the power condition of the guest server, the OS of the guest server, and a job label 404 indicating the use application for the guest server are displayed in the VMGuest detail view 500 are displayed in the VMGuest detail view 500.

Figure 10:
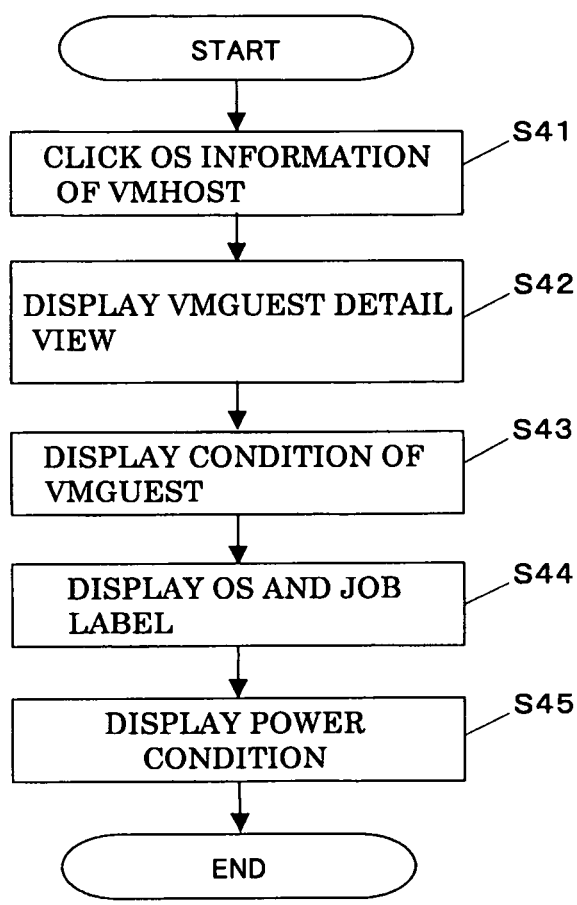
FIG. 10 is a diagram illustrating an example of a displaying process flow for displaying a VMGuest detail view.

FIG. 10 is a diagram illustrating an example of a displaying process flow for displaying the VMGuest detail view. When the user clicks the OS (VMOS-C) of the VMHost displayed in the slot correspondence information display area 103 corresponding to the slot number 7 in FIG. 9, the information inputting unit 11 inputs the selection information according to the click operation (step S41). As illustrated in the server information display screen of FIG. 11, the editing unit 13 instructs the displaying unit 14 to display the VMGuest detail view 500 corresponding to the slot number 7, for example, in the position below the server list view 102 (step S42). Next, the editing unit 13 refers to VMGuest information included in the server information, obtains the condition of the VMGuest managed by the VMHost, and instructs the displaying unit 14 to display the condition icon 408 indicating the condition in the VMGuest detail view 500 (step S43).

Next, the editing unit 13 obtains information on the OS of the VMGuest which is included in the VMGuest information, and the job label information on the VMGuest, which is included in the job label information of the above server information, and instructs the displaying unit 14 to display the OS of the VMGuest and the job label 404 in the VMGuest detail view 500 (step S44). The editing unit 13 obtains the power condition of the VMGuest which is included in the above VMGuest information, and instructs the displaying unit 14 to display the power condition icon 406 indicating the power condition of the VMGuest (step S45).

Figure 12:
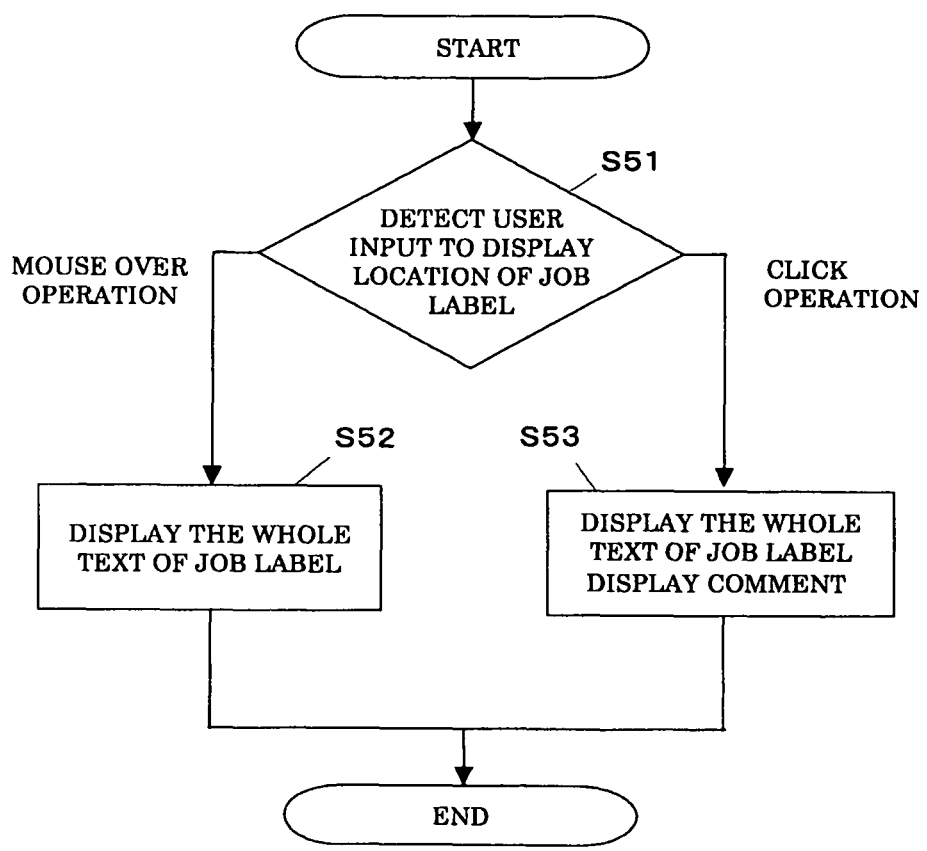
FIG. 12 is a diagram illustrating an example of a displaying process flow for displaying a job label or a comment.

FIG. 12 is a diagram illustrating an example of a displaying process flow for displaying the job label or the comment. First, the information inputting unit 11 detects an input by the user to a display location of the job label on the server information display screen (step S51), and determines whether the input is an input by a mouse over operation on the job label, or an input by a click operation for the job label. When the information inputting unit 11 determines that the an input is the input by the mouse over operation on the job label, the information inputting unit 11 inputs the selection information according to the mouse over operation, and according to the inputted selection information, the editing unit 13 displays the whole text of the character information indicated by the job label information included in the server information (step S52). As a result, the whole text of the mouse-overed job label is displayed. When the information inputting unit 11 determines that the input is the input by the click operation for the job label, the information inputting unit 11 inputs the selection information according to the click operation. The editing unit 13 instructs the displaying unit 14 to display the whole text of the character information indicated by the job label information included in the server information, and the displaying unit 14 displays the comment included in the server information (step S53). At step S53, for example, the person in charge of the logical server, the contact address of the person, and the dealing method when any failure is induced in the logical server are displayed as the comment. Thus, by referring to the comment, the user can easily comprehend the information on the person in charge of the logical server, the contact address of the person, and the dealing method when any failure is induced in the corresponding logical server.

According to the displaying process for displaying the job label or the comment, which is described by referring to FIG. 12, and the displaying process for displaying the server information in the slot correspondence information display area, which is described by referring to FIG. 8, when the failure is induced in the server, the user can quickly deal with the failure. That is, when the failure is induced in the server stored in the slot of the slot number "2" of the chassis 2, for example, as illustrated in FIG. 9, by the process at step S32 of FIG. 8, the physical server icon 300 indicating the server, and the condition icon 200 indicating that the server is in the error condition are displayed in the slot correspondence information display area 103 corresponding to the slot number 2 in the server condition display screen. When the user clicks the job label 401 in which "marketing 2" is described on the slot correspondence information display area 103, the person in charge of the server, the contact address of the person, and the dealing method when any failure is induced in the server are displayed by the process at the step S53 of FIG. 12. Therefore, the user can quickly deal with the failure induced in the server.

Figure 13:
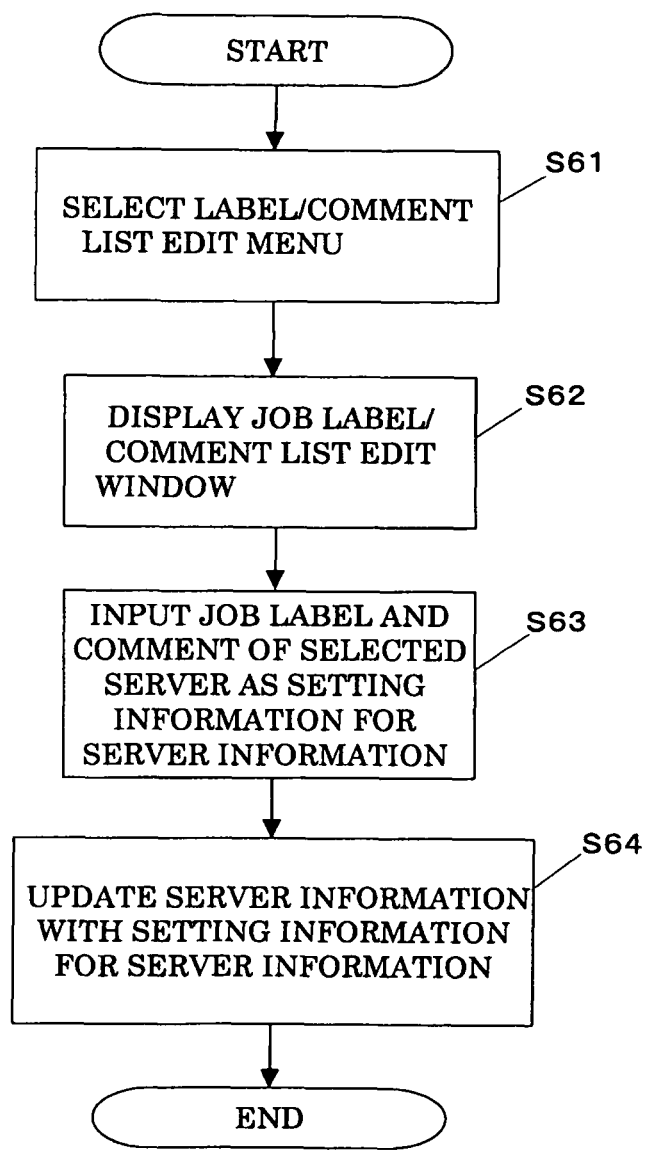
FIG. 13 is a diagram illustrating an example of an update controlling process flow for update-controlling the server information in the server information DB.

FIG. 13 is a diagram illustrating an example of an update controlling process flow for update-controlling the server information in the server information DB 15. In FIG. 13, the example of the update controlling process flow will be described by using, as an example, the update controlling process for update-controlling the job label information and the comment included in the server information.

First, when the user selects a label/comment list edit menu 600 on the server information display screen illustrated in FIG. 9, the information inputting unit 11 inputs the selection information according to the selecting operation (step S61). According to the inputted selection information, the controlling unit 12 instructs the displaying unit 14 to display a job label/comment list edit window (not shown) (step S62). The job label/comment list edit window is a screen for setting the job label and the comment, and displays, for example, a selection column for the logical server, an input column for the job label corresponding to the logical server, and an input column for the comment. When the user selects the logical server in the selection column for the logical server, inputs the job label in the input column for the job label corresponding to the logical server, and inputs the comment in the input column for the comment, the information inputting unit 11 inputs, as the setting information for the server information, information on the selected logical server, information on the inputted job label and comment (step S63). The controlling unit 12 specifies the server information corresponding to the above selected logical server of the server information in the server information DB 15, and updates the job label and the comment included in the specified server information with the job label and the comment included in the setting information for the server information (step S64). According to the update-controlling process for update-controlling the job label information and the comment included in the server information, which is described by referring to the FIG. 13, the user can freely edit the job label information and the comment.

Figure 14:
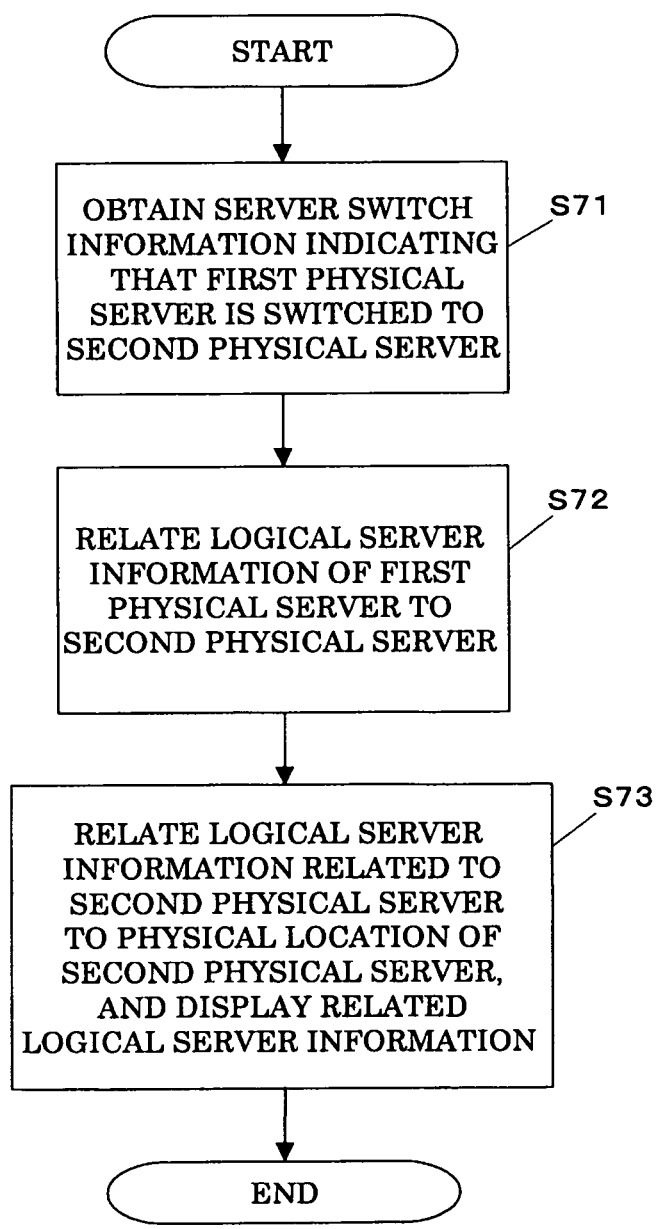
FIG. 14 is a diagram illustrating an example of a displaying process flow when a physical server is switched.

FIG. 14 is a diagram illustrating an example of a displaying process flow when the physical server is switched. In FIG. 14, the example of the displaying process flow will be described by using, as an example, the displaying process when the first physical server in the chassis 2 is switched to the second physical server in the waiting condition. First, the controlling unit 12 obtains, through the network 3, server switch information indicating that the first physical server in the chassis 2 is switched to the second physical server in the waiting condition (step S71). Based on the obtained server switch information, the controlling unit 12 relates the logical server information related to the first physical server to the second physical server in the server information DB 15 (step S72), and the process proceeds to step S73.

Figure 15:
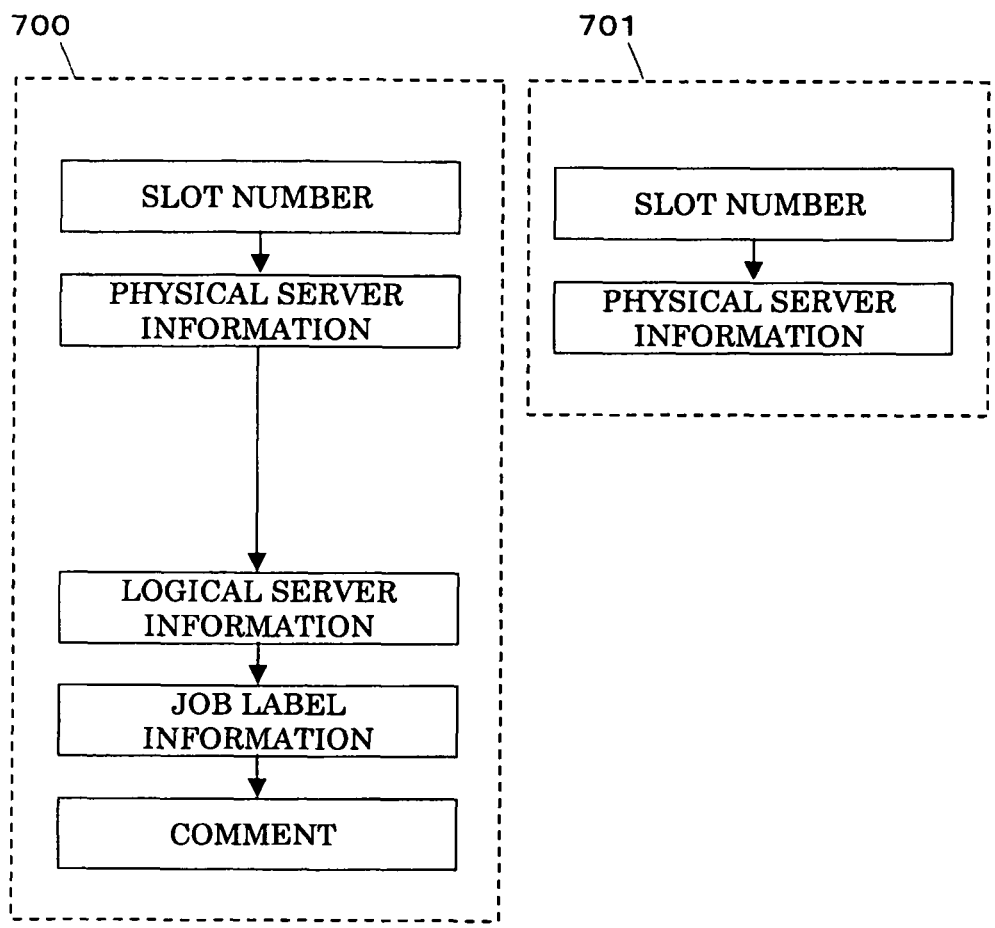
FIGS. 15 and 16 are diagrams describing a relating process for relating logical server information, job label information, and a comment.
Figure 16:
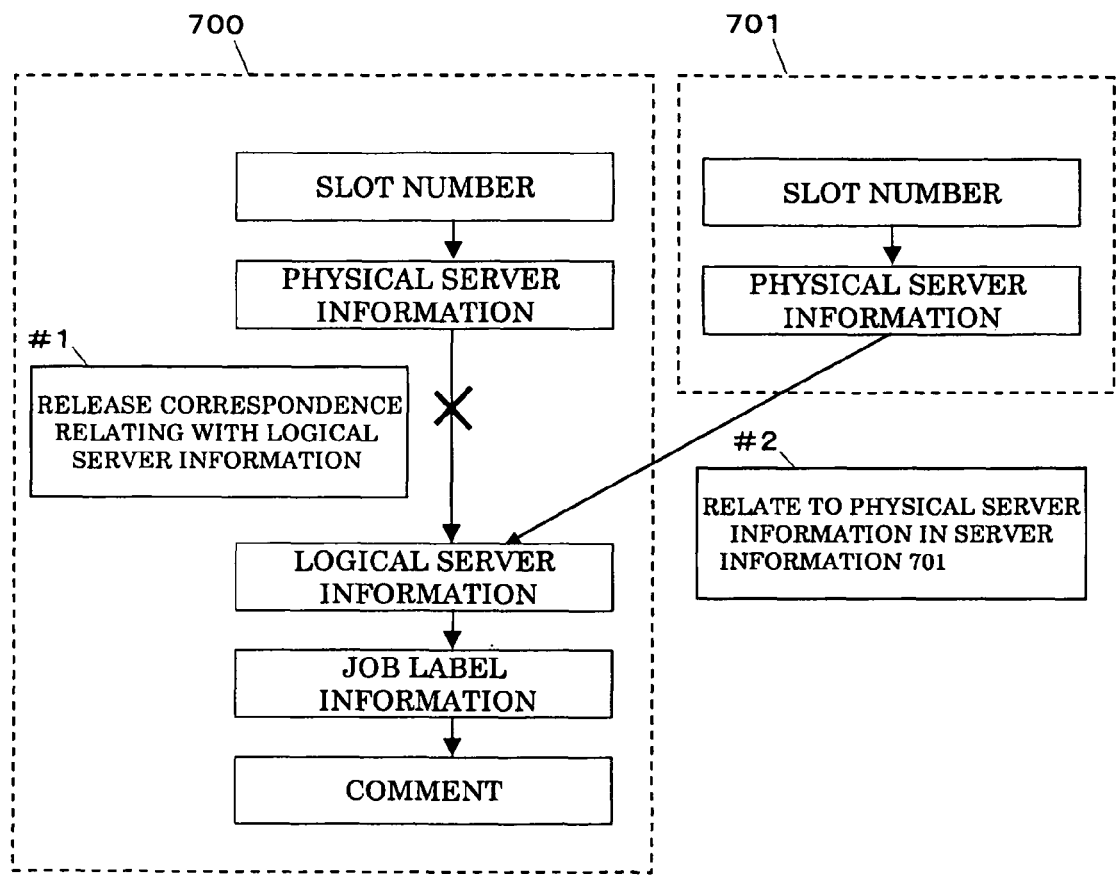

FIGS. 15 and 16 are diagrams describing a relating process for relating the logical server information, the job label information, and the comment at the step S72. Reference numeral 700 illustrated in FIG. 15 denotes the server information on the first physical server (operating server), and Reference numeral 701 illustrated in FIG. 15 denotes the server information on the second physical server (waiting server) which is in the waiting condition while the operating server is operating.

Here, when an error is induced in the operating server, the operating serve is switched to the waiting server, and the waiting server becomes the new operating server, as illustrated by #1 in FIG. 16, the controlling unit 12 releases the correspondence relating between the logical server information included in server information 700 and the physical server information included in the server information 700. Then, as illustrated by #2 in FIG. 16, the controlling unit 12 relates (links) the logical server information included in the server information 700 to the physical server information included in the server information 701.

At step S73, the controlling unit 12 instructs the editing unit 13 to relate the logical server information related to the second physical server at the step S72 to the physical location of the second physical server to display the related logical server information (step S73). For example, when the error is induced in the first physical server indicated by the physical server icon 300 displayed in the slot correspondence information display area 103 corresponding to the slot number 2 illustrated in FIG. 9, and the first physical server is switched to the waiting second physical server in a slot, "OS-A", the logical server icon 400, the job label 401 in which "marketing 2" is described, and the comment, which have been related to the first physical server, are related to the physical server icon indicating the second physical server, and are displayed in the slot correspondence information display area 103 corresponding to the slot number of the slot.

According to the server managing apparatus and the server managing method of the embodiment of the present invention, it becomes possible to display, on the screen simulating the physical location of the physical servers, the physical server information, and the logical server information including the information on the use application and the attribute information for the logical server, which are related to the physical location of each physical server. As a result, the user, who refers to a result displayed by the present server managing apparatus and the present server managing method, becomes possible to easily comprehend the physical server information and the logical server information including the information on the use application and the attribute information for the logical server, which are related to the physical location of each physical server.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. A server managing apparatus with a computer processor managing a server group including a plurality of physical servers each of which functions as one or more logical servers, the server managing apparatus comprising:
 a storing unit that stores a plurality of server information each of which includes physical server information and logical server information, each physical server information and each logical server information being related to a slot number, the slot number identifying a slot in which a physical server is stored, the logical server information further including information on use application and attribute information for a logical server; and
 a displaying unit that executes on the computer processor for reading the server information from the storing unit, and displaying the physical server information and the logical server information, based on the server information, on a screen including a plurality of slot correspondence information display areas each of which corresponds to a slot number, each physical server information and each logical server information being displayed in a slot correspondence information display area which corresponds to same slot number for the physical server information and the logical server information,
 wherein the displaying unit displays, on the screen, a condition of a physical server corresponding to the physical server information, and a condition of a logical server corresponding to the logical server information, in a state that the condition of the physical server and the condition of the logical server are related on the screen by a displayed slot correspondence display area to a physical location of the physical server, and
 wherein the physical server information comprises information indicating a power condition of the physical server, and condition of the physical server indicating that the physical server is in one or more of stop condition, error condition, normal condition and alarm condition, and the logical server information comprises a type of OS (Operating System), and condition of the logical server indicating that the logical server is in one or more of stop condition, error condition and alarm condition.

2. The server managing apparatus according to claim 1, further comprising:
 a controlling unit that executes on the computer processor for update-controlling the server information stored in the storing unit.

3. The server managing apparatus according to claim 2, wherein the controlling unit further relates the logical server information related to a first physical server to a second physical server when the first physical server is switched to the second physical server, and wherein the displaying unit displays the information related by the controlling unit.

4. A server managing method in a server managing apparatus managing a server group including a plurality of physical servers functioning as one or more logical servers, the method comprising:

reading a plurality of server information from a storing unit, each of the plurality of server information including physical server information and logical server information, each physical sever information and each logical server information being related to a slot number, the slot number identifying a slot in which a physical server is stored, the logical server information further including information on use application and attribute information for the logical server; and displaying the physical server information and the logical server information, based on the server information, on a screen including a plurality of slot correspondence information display areas each of which corresponds to a slot number, each physical server information and each logical server information being displayed in a slot correspondence information display area which corresponds to same slot number for the physical server information and the logical server information, wherein the displaying unit displays, on the screen, a condition of a physical server corresponding to the physical server information, and a condition of a logical server corresponding to the logical server information, in a state that the condition of the physical server and the condition of the logical server are related on the screen by a displayed slot correspondence display area to a physical location of the physical server, and wherein the physical server information comprises information indicating a power condition of the physical server, and condition of the physical server indicating that the physical server is in one or more of stop condition, error condition, normal condition and alarm condition, and the logical server information comprises a type of OS (Operating System), and condition of the logical server indicating that the logical server is in one or more of stop condition, error condition, normal condition and alarm condition.

5. The server managing method according to claim 4, further comprising update-controlling the server information stored in the storing unit.

6. The server managing method according to claim 5, wherein, in the step of update-controlling, the logical server information related to a first server is related to a second physical server when the first physical server is switched to the second physical server, and wherein, in the step of displaying, the information related in the step of update-controlling is displayed.

* * * * *